Figure 1:
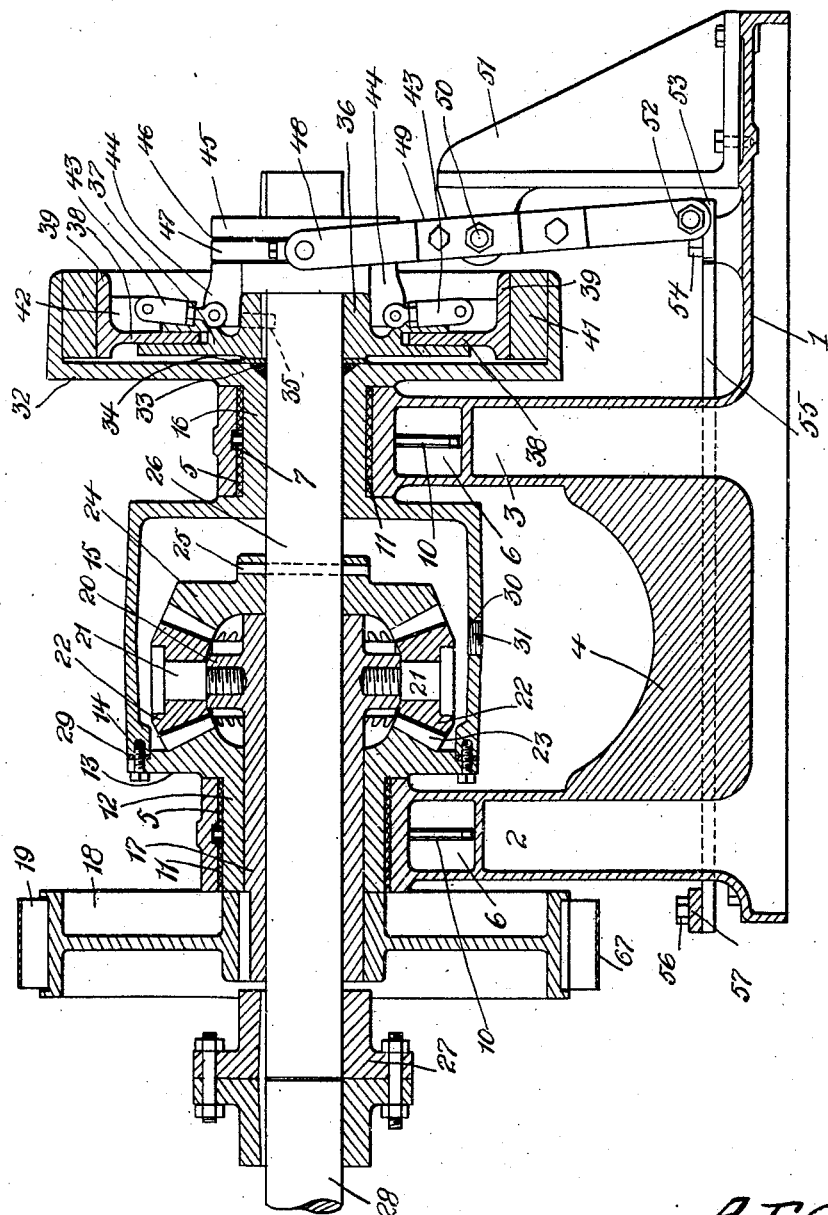

A. F. CLARKE.
GEARING.
APPLICATION FILED APR. 9, 1909.

954,169.

Patented Apr. 5, 1910.
4 SHEETS—SHEET 1.

Witnesses
Samuel Payne.
R. H. Butler.

Inventor
A. F. Clarke
By H C Evarts
Attorneys.

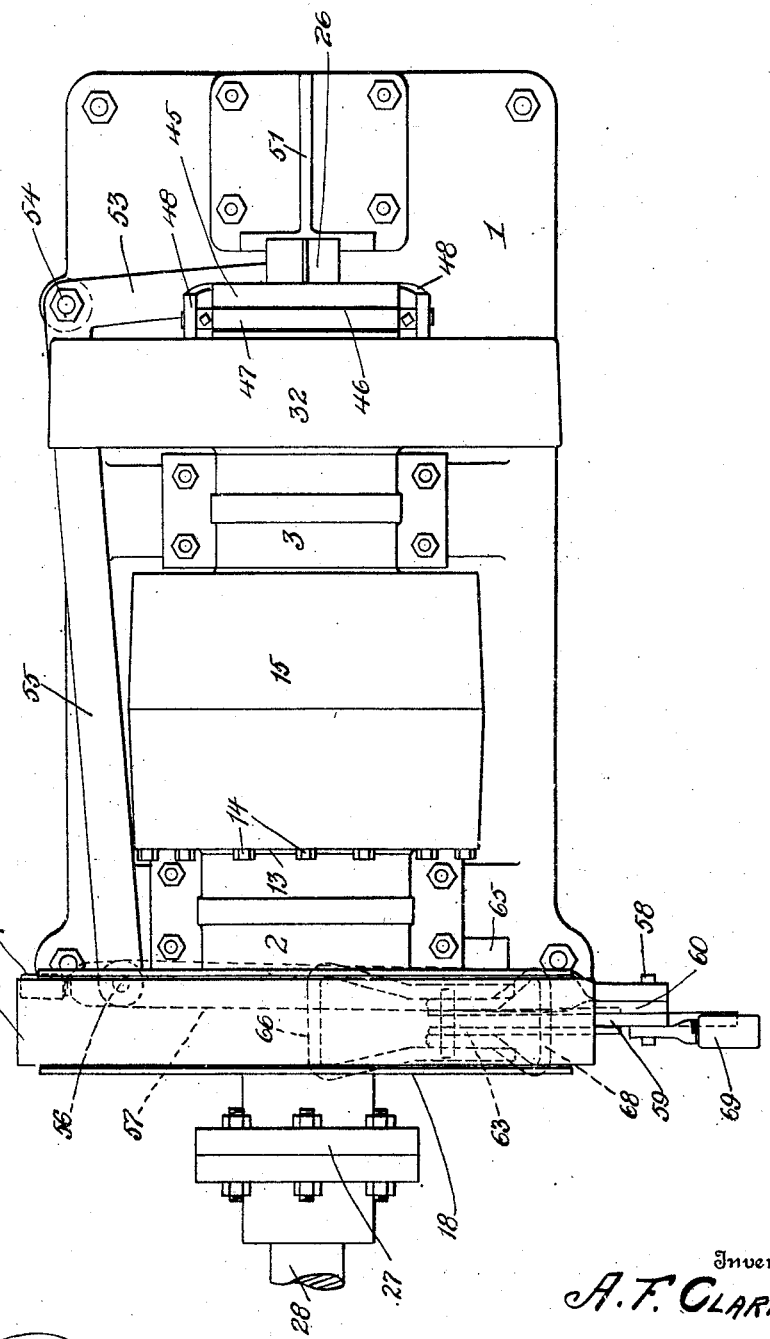

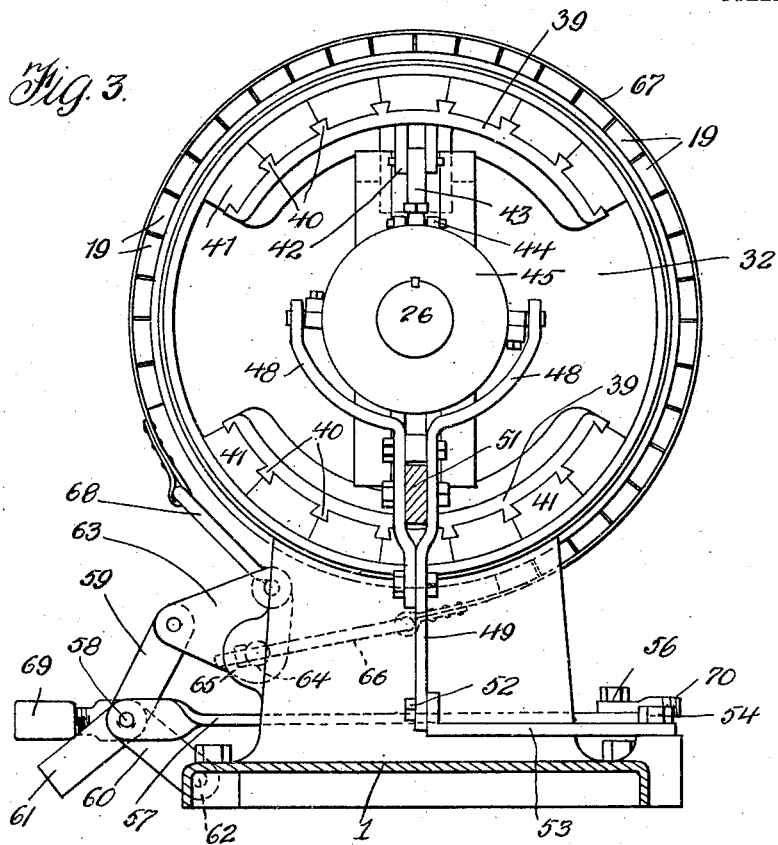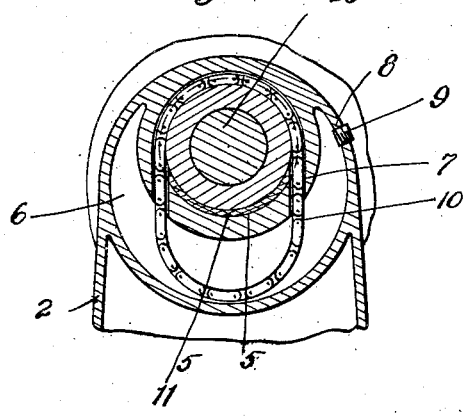

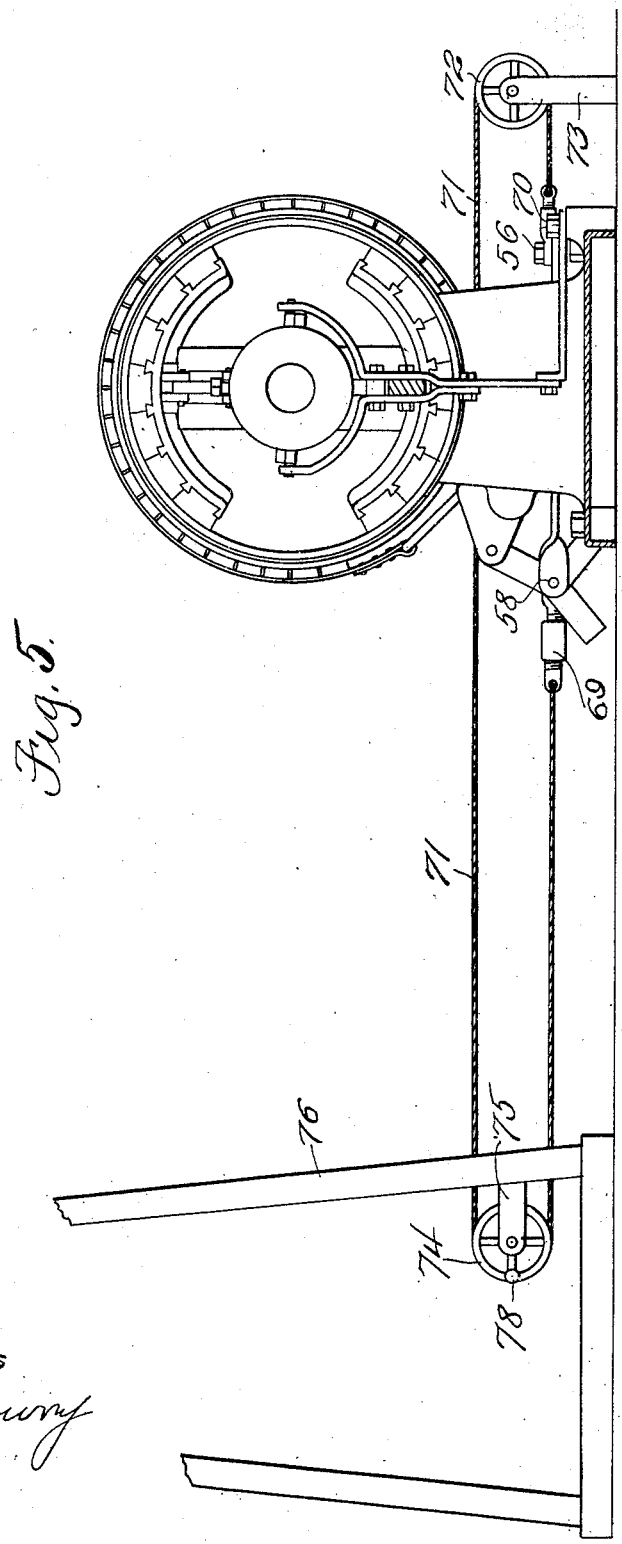

UNITED STATES PATENT OFFICE.

ARTHUR F. CLARKE, OF BUTLER, PENNSYLVANIA, ASSIGNOR TO T. W. PHILLIPS MFG. CO., OF BUTLER, PENNSYLVANIA, A CORPORATION OF PENNSYLVANIA.

GEARING.

954,169.  Specification of Letters Patent.  Patented Apr. 5, 1910.

Application filed April 9, 1909. Serial No. 488,901.

*To all whom it may concern:*

Be it known that I, ARTHUR F. CLARKE, a citizen of the United States of America, residing at Butler, in the county of Butler and State of Pennsylvania, have invented certain new and useful Improvements in Reversible Gearing, of which the following is a specification, reference being had therein to the accompanying drawing.

This invention relates to reversible gearing, and more particularly to a gearing designed for use in the oil fields, where it is desirable to control the operation of an engine located some distance from a derrick floor.

The primary object of this invention is to provide a reversible gearing that will be positive in its action, simple and durable in construction, free from injury by ordinary use, and highly efficient for the purposes for which it is intended.

The invention aims to provide a self-contained base or stand for a reversible gearing which will eliminate strains and stresses on engine bearings, thus relieving an engine of unnecessary friction due to the belt transmission. To this end, I provide a self-contained base or stand with novel lubricant compartments, and shape the stand to support a brake wheel pulley and clutch mechanism whereby these three mentioned elements will be equally balanced and easily controlled by a mechanism located upon the bed plate of the base or stand.

A further object of this invention is to provide the gearing with a pulley having a large lubricant compartment in which the reversing mechanism is located, a portion of the reversing mechanism being carried by the pulley, another portion by a quill supporting the brake wheel, and still another portion by the driven shaft of the device. In locating the reversing mechanism in the pulley which forms the lubricant receptacle, a compact structure is formed and a positive lubrication and easy running of the reversing mechanism insured.

A still further object of this invention is to provide a reversible gearing with detachable clutch blocks readily renewed when worn.

With the above and other objects in view which will more readily appear as the invention is better understood, the same consists in the novel construction combination and arrangement of parts to be presently described and then claimed.

In the drawings, Figure 1 is a longitudinal sectional view of the reversible gearing in accordance with this invention, Fig. 2 is a plan of the same, Fig. 3 is an end view of the same partly in section. Fig. 4 is a cross sectional view of a portion of the stand or base, illustrating one of the lubricant compartments thereof, and Fig. 5 is an end elevation of the reversible gearing showing a conventional means for operating the clutch of brake elements thereof.

To put my invention into practice, I provide a stand for the movable parts of the gearing mechanism, this stand being independent of an engine whereby the gearing mechanism will be firmly supported and will relieve the engine of all vibrations due to a rapid manipulation of the gearing mechanism. The stand comprises a cast iron base 1, provided with oppositely disposed bearings 2 and 3, connected by a web 4. The bearings 2 and 3 are identical in construction, with the exception that the upper end of the bearing 2 is provided with a larger bore 5 than the bore of the bearing 3, the object of which will presently appear. Each bearing is cast with a crescent shaped lubricant compartment 6 communicating with the bore 5 of the bearing through the medium of openings 7. A lubricant is placed in the compartment 6 through an opening 8 having a detachable plug 9, and in order that the lubricant will be conveyed to the bore 5 of the bearing, an endless feed chain 10 is used. The bores 5 of the bearings 2 and 3 are babbitted, as at 11, and in the bearing 2 is journaled a sleeve 12 carrying a pulley head 13, which is connected by screw bolts 14 to a hollow pulley 15 having a hub 16, journaled in the bearing 3.

Journaled in the sleeve 12, is a quill 17 having the ends thereof extending beyond the sleeve 12. The outer end of the quill 17 is provided with a fixed brake wheel 18 having the periphery thereof fitted with wooden blocks 19. The opposite end of the quill extending into the pulley 15 is provided with oppositely disposed sockets 20 for bearing pins 21 upon which are revolubly mounted beveled gear wheels 22. The beveled gear wheels 22 are adapted to mesh with the circular rack 23 carried by the pulley head 13, and with a gear wheel 24 fixed, as at 25, upon a driven shaft 26 journaled in the quill 17 and the hub 16 of the pulley 15, said shaft being arranged longitudinally of the stand. The shaft 26 protrudes beyond the brake wheel 18, and is adapted to be connected by a coupling 27 to the drive shaft 28 of an engine, (not shown).

Interposed between the head 13 and the pulley 15 is a gasket 29, adapted to establish a non-leakable connection between these two elements, whereby the hollow pulley 15 can be filled with a lubricant to insure an easy running of the gear wheels and rack within said pulley, the lubricant being placed in said pulley through an opening 30 normally closed by a plug 31 having the outer end thereof flush with the periphery of said pulley.

Formed integral with the hub 16 of the pulley is a clutch wheel 32, and to prevent the lubricant from the interior of the pulley 15 from wasting from the outer end of the hub 16, this end of the hub 16 is packed, as at 33, the packing being retained in place by a plate 34.

Slidably mounted upon the shaft 26 within the clutch wheel 32 and fixed with relation to said shaft by a screw 35 is a shoe box 36 having oppositely disposed bearings 37 for shanks 38 of segment shaped shoes 39, said shoes having dovetailed tongues 40 for holding wooden gripping blocks 41 upon said shoes. The confronting lower edges of these blocks are grooved to receive the tongues 40 of said shoes, and by removing the set screw 35 and moving the box 36 outwardly, the wooden gripping blocks 41 can be renewed. The shoes 39 are provided with brackets 42 and pivotally connected to said brackets are adjustable toggles 43, said toggles being pivotally connected to extensions 44 of a collar 45 slidably mounted upon the shaft 26 and adapted to rotate therewith. The collar 45 is provided with a peripheral groove 46 for a band 47, and pivotally connected to opposite sides of said band are the arms 48 of a yoke 49, said yoke being pivotally connected, as at 50, to a bracket 51 secured to the base 1 of the stand.

The lower end of the yoke 49 is pivotally connected, as at 52, to the short arm 53 of a horizontal bell crank lever pivotally mounted, as at 54, at the rear edge of the base 1. The long arm 55 of said lever extends to the brake wheel 18 and is pivotally connected by a pin 56, to an arm 57. This arm extends to the forward edge of the base 1 and is provided with a pivot pin 58 for toggle links 59 and 60, the former having an extension 61 adapted to contact with the pivot pin 62 of the toggle link 60 which is connected to the forward edge of the base 1. The upper end of the toggle link 59 is pivotally connected to a member 63, said member being pivotally mounted upon a pin 64 carried by a lug 65 of the bearing 2. Fixed to the pin 64 is a triangular link 66 to which is connected a brake band 67 surrounding the brake wheel 18 and adapted to frictionally engage the blocks 19 thereof. The opposite end of a brake band 67 is connected by a triangular link 68 to the member 63.

Attached to the pin 56 is a coupling 70 having secured thereto one end of a flexible member 71. The latter passes around a pulley 72 mounted in a support 73. The other end of the flexible member 71 is fixed to a coupling 69 attached to the pin 58. The member 71 passes over a manually operated pulley 74 mounted in a bracket 75 projecting from one of the posts of a derrick 76. The wheel 72 is provided with a handle 78 and if operated in one direction, the clutch element of the gearing will be thrown in operative position and if operated in the opposite direction the braking element of the gearing will be thrown into operative position. By the foregoing arrangement of parts the gearing can be operated from the derrick floor or from a point remote from the gearing.

Operation: By reference to Fig. 3 of the drawings, it will be noted that the toggle links 59 and 60 are drawn outwardly, and that the brake band 36 is loose relative to the brake wheel 58, while the clutch shoes 39 are held in engagement with the clutch wheel 32. Since the clutch wheel 32 is a part of the pulley 15, said pulley rotates with the driven shaft 26, and since the gear wheel 24 and the pulley head 13 are carried with the pulley, the brake wheel 18 will rotate in a similar direction. Immediately upon the toggle links 59 and 60 being thrown inwardly until the extension 61 of the link 59 impinges the pin 62, the member 63 will tighten the band 67 and cause the same to frictionally hold the brake wheel 18. Such a movement of the toggles 59 and 60 releases the clutch shoes 39, allowing the clutch wheel 32 to revolve with the pulley 15. Since the gear wheel 24 is fixed relative to the driven shaft 26, said gear wheel meshing with the gear wheels 22 and these gear wheels with the rack 23, the rotation of the pulley 15 will be reversed, said pulley revolving in an opposite direction from the driven shaft 26.

From the foregoing description, it will be observed that I have devised a novel reversible gearing, for alternately gripping a clutch wheel and a brake wheel, to cause the pulley to travel in either direction, as occasion and necessity may demand. Compactness and simplicity of construction are accomplished in embodying the reverse mechanism in the pulley, and in making the interior of the pulley a lubricant compartment, a positive, nonfrictional, and economical operation of the reversible gearing is obtained, with a minimum degree of lost motion and wear and tear upon an engine in connection with which the gearing is used.

Having now described my invention, what I claim as new, is:—

1. In a reversible gearing, the combination with a driving shaft, of a stand, said stand comprising bearings having lubricant compartments formed therein, a pulley journaled in said bearings and adapted to revolubly support said driving shaft, said pulley having a lubricant compartment formed therein, a quill revolubly mounted upon said shaft and extending into said pulley, a brake wheel mounted upon the outer end of said quill, revoluble gear wheels supported by said quill within said pulley, a rack carried by said pulley and meshing with said wheels, a gear wheel carried by said shaft and meshing with said gear wheels, a clutch wheel carried by said pulley, shoes arranged within said wheel for frictionally engaging the same, a toggle mechanism for moving said shoes, a brake band for frictionally engaging said brake wheel, and means supported by said stand for alternately moving said toggle mechanism and said brake band.

2. In a reversible gearing, the combination with a driving shaft, of a stand, said stand comprising bearings having lubricant compartments formed therein, a pulley journaled in said bearings and adapted to revolubly support said driving shaft, said pulley having a lubricant compartment formed therein, a quill revolubly mounted upon said shaft and extending into said pulley, a brake wheel mounted upon the outer end of said quill, revoluble gear wheels supported by said quill within said pulley, a rack carried by said pulley and meshing with said wheels, a gear wheel carried by said shaft and meshing with said gear wheels, a clutch wheel carried by said pulley, a shoe box mounted upon said shaft within said wheel, shoes movably supported by said box for frictionally engaging said wheel, toggles for moving said shoes, a collar for moving said toggles, a yoke pivotally supported by said stand for moving said collar, a bell crank lever mounted upon said stand for moving said yoke, a brake band adapted to engage said brake wheel, and means actuated by said bell crank lever for moving said band to frictionally engage said wheel.

3. In a reversible gearing, the combination with a driving shaft, of a stand, said stand comprising bearings having lubricant compartments formed therein, a pulley journaled in said bearings and adapted to revolubly support said driving shaft, said pulley having a lubricant compartment formed therein, a quill revolubly mounted upon said shaft and extending into said pulley, a brake wheel mounted upon the outer end of said quill, wooden blocks carried by the periphery of said wheel, revoluble gear wheels supported by said quill within said pulley, a rack carried by said pulley and meshing with said wheels, a gear wheel carried by said shaft and meshing with said gear wheels, a clutch wheel carried by said pulley, a shoe box mounted upon said shaft within said wheel, shoes movably supported by said box for frictionally engaging said wheel, toggles for moving said shoes, a collar for moving said toggles, a yoke pivotally supported by said stand for moving said collar, a bell crank lever mounted upon said stand for moving said yoke, a brake band adapted to engage said brake wheel, means actuated by said bell crank lever for moving said band to frictionally engage said wheel, said means including toggle links and a pivoted member connecting said links with said brake band.

4. In a reversible gearing, the combination with a driving shaft, of a stand, said stand comprising bearings, said bearings having lubricant compartments formed therein provided with feed chains, a sleeve journaled in one of said bearings, a head carried by said sleeve, a rack carried by said head, a pulley connecting with said head, and having a hub revolubly mounted in the other of said bearings, a quill journaled in said sleeve and with the hub of said pulley adapted to support said driving shaft, a brake wheel carried by one end of said quill, oppositely disposed gear wheels carried by said quill and meshing with the rack of said pulley head, a gear wheel fixed upon said driving shaft and meshing with the gear wheels of said quill, a clutch wheel carried by the hub of said pulley, a shoe box mounted upon said shaft within said wheel, segment shaped shoes movably supported by said box, wooden gripping blocks carried by said shoes for frictionally engaging said clutch wheel, toggle links connecting with said shoes, a collar surrounding said shaft for moving said toggle links, a pivoted yoke supported by said stand for moving said collar, a bell crank lever located upon said stand for moving said yoke, a brake band connected to said stand and encircling said brake wheel, and means actuated by said bell crank lever for moving said brake band.

5. In a reversible gearing, the combination with a driving shaft, of a stand, said stand comprising bearings, said bearings having lubricant compartments formed therein provided with feed chains, a sleeve journaled in one of said bearings, a head carried by said sleeve, a rack carried by said head, a pulley connected with said head, and having a hub revolubly mounted in the other of said bearings, a quill journaled in said sleeve and with the hub of said pulley adapted to support said driving shaft, a brake wheel carried by one end of said quill, wooden blocks carried by the periphery of said wheel, oppositely disposed gear wheels carried by said quill and meshing with the rack of said pulley head, a gear wheel fixed upon said driving shaft and meshing with the gear wheels of said quill, a clutch wheel carried by the hub of said pulley, a shoe box mounted upon said shaft within said wheel, segment shaped shoes movably supported by said box, wooden gripping blocks carried by said shoes for frictionally engaging said clutch wheel, toggle links connecting with said shoes, a collar surrounding said shaft for moving said toggle links, a pivoted yoke supported by said stand for moving said collar, a bell crank lever located upon said stand for moving said yoke, a brake band connected to said stand and encircling said brake wheel, and means actuated by said bell crank lever for moving said brake band, said means including toggle links and a member moved by said links and connected with said band.

In testimony whereof I affix my signature in the presence of two witnesses.

ARTHUR F. CLARKE.

Witnesses:
E. M. HUBER,
F. C. NEGLEY.